United States Patent [19]
Kronen

[11] Patent Number: 5,230,557
[45] Date of Patent: Jul. 27, 1993

[54] 3RD BRAKE LIGHT BURNOUT DETECTION SYSTEM

[76] Inventor: Larry Kronen, 20155 N. Larkmoor, Southfield, Mich. 48076

[21] Appl. No.: 814,426

[22] Filed: Dec. 30, 1991

[51] Int. Cl.⁵ .............................................. B60Q 1/00
[52] U.S. Cl. .................................... 362/80; 362/80.1; 362/293; 340/458
[58] Field of Search ................. 362/61, 80.1, 80, 83.3, 362/343, 276, 293; 340/458, 479

[56] References Cited

U.S. PATENT DOCUMENTS

| | | | |
|---|---|---|---|
| 1,370,674 | 3/1921 | Smith | 362/80.1 |
| 4,893,112 | 1/1990 | Hatcher | 340/479 |
| 4,903,008 | 2/1990 | Lewis | 340/458 |
| 4,954,808 | 9/1990 | Duerkob | 362/80.1 X |

Primary Examiner—Stephen F. Husar

[57] ABSTRACT

An inexpensive approach to identify automobile 3rd brake lamp failures by drilling 2 holes, 1 in the reflector, and 1 in the outer housing, then covering the inner portion of hole in the outer body with a red plastic lens to allow the flowing filament to shine thru the outer body, thereby allowing the driver to detect 3rd brake lamp malfunction by observing the housing assembly in the rear view mirror.

3 Claims, 4 Drawing Sheets

3RD BRAKE LIGHT BURNOUT DETECTION SYSTEM

FIELD OF INVENTION

This invention relates to identification of 3rd brake light lamp failures in automobiles.

BACKGROUND OF THE INVENTION

This invention relates to vehicle safety devices and specifically to collision avoidance lamps mounted high on so equipped vehicles such as rear shelf or upper areas of the rear windows. While collision avoidance lamps have been standard equipment on most automobiles since 1986, as yet this inventor has not seen any means for a car operator to readily be able to recognize the fact that their 3rd brake lamp is not functioning.

SUMMARY OF THE INVENTION

This invention allows a driver to check 3rd brake lamp operation whenever brakes are applied, merely by looking in the rear view mirror. If the red indicator is on, the brake light is functioning properly. The merits of high mounted 3rd brake lights have proven to reduce or minimize damage in rear end collisions. In order to be effective, the high mounted lamps must be operating, not burned out. The idea behind this invention came to surface when this inventors wife mentioned that the upper brake light on my car was not working. While replacing the lamp, there was need to completely remove the entire assembly from the rear shelf. After opening the case, it became evident that there was an easy method to alert the driver of any inside mounted high brake light malfunction.

DRAWING FIGURES

REFERENCE NUMERALS IN DRAWINGS

Figure 1:
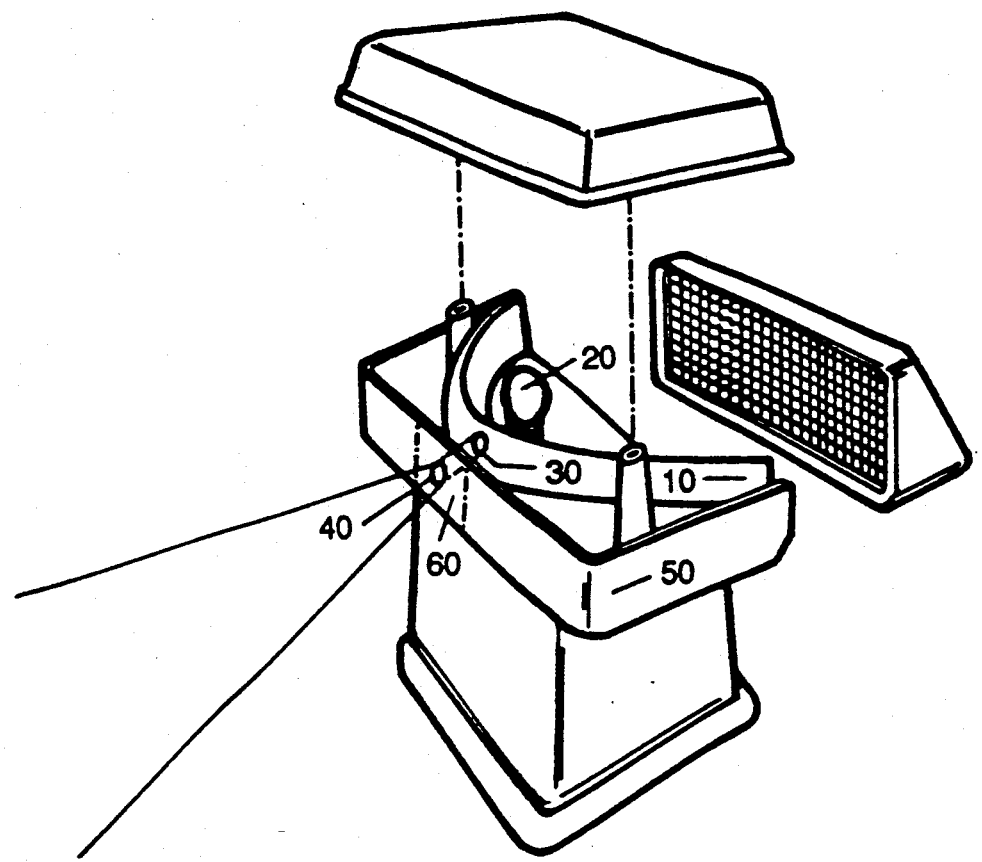
FIG. 1 shows a front, side exploded view explaining the principle of the invention.
Figure 2:
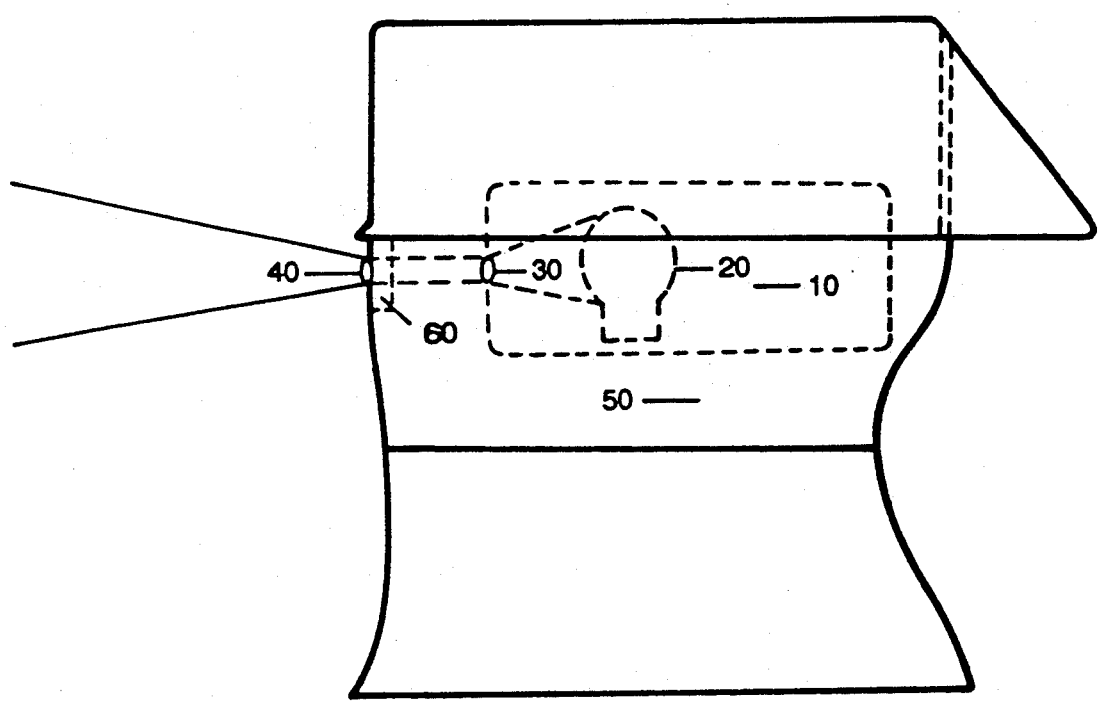
FIG. 2 is a side view of brake light assembly illustrating why alignment of holes #30 and #40 and bulb #20 is critical.
Figure 3:
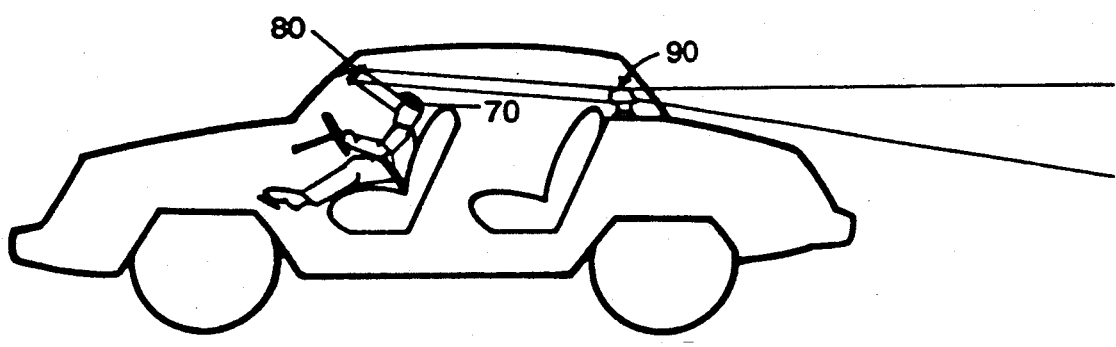
FIG. 3 shows how drivers vision by looking in rear view mirror will observe operating or non-operating brake lamp.
Figure 4:
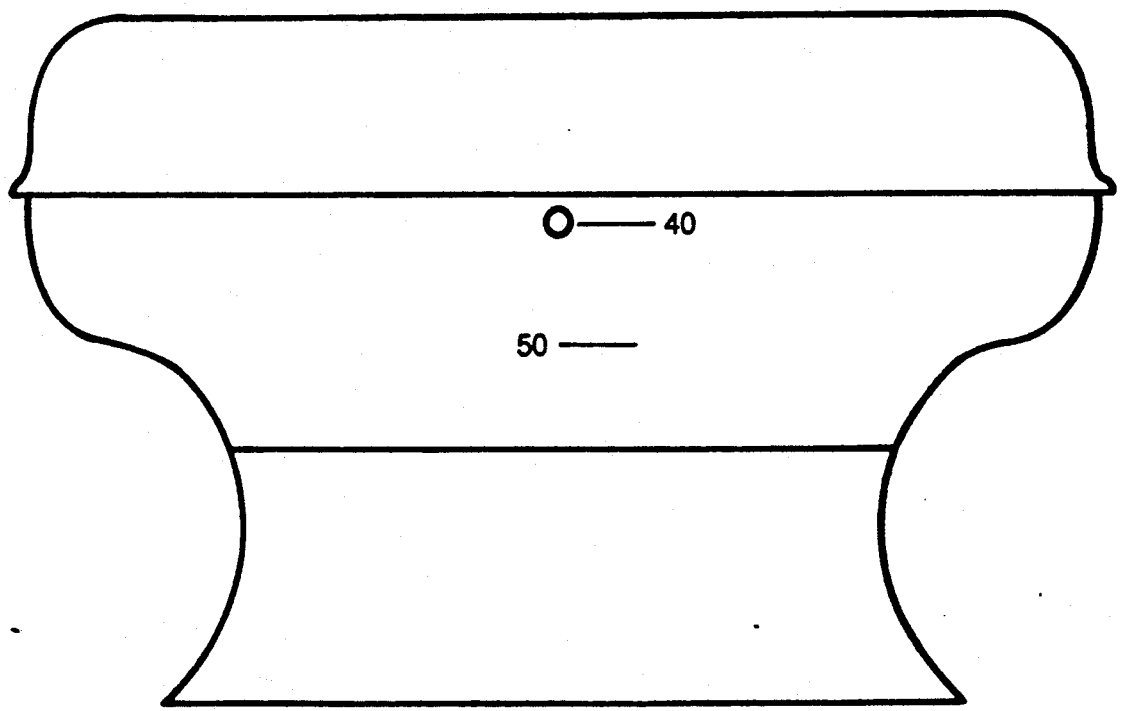
FIG. 4 shows front view of modified brake light assembly.

10. Reflector
20. Bulb
30. 9/64 hole in reflector
40. 9/64 hole in outer case
50. Outer case
60. Red plastic lens
70. Driver
80. Rear view mirror
90. Complete assembly

DETAILED DESCRIPTION OF PREFERRED EMBODIMENTS

This inventor drilled a 9/64 hole #30, in the reflector #10, directly behind the bulb #20. Then a 9/64 hole #40 was drilled in the outer case #50. It must be realized that to be effective, both holes #30 and #40 must be inline with bulb #20. A ½" square piece of red plastic #60, was then cemented to the inside of the outer case #50. This inventor has modified his and his wife's car during the summer of 1991 and to the date of this application has proven effective.

What is claimed:

1. An illuminated brake warning system for a vehicle, comprising in combination:
   a. a sealed rectangular enclosure with two openings;
   b. a lamp triggered by the vehicles braking system;
   c. one opening, the larger of the two, covered by a removable red plastic lens;
   d. the smaller opening covered from the inside of said enclosure with a fixed red plastic lens;
   wherein the smaller opening in said enclosure is at a proper height so as to enable the vehicle's operator to observe the operation of said lamp.

2. The illuminated brake warning system of claim 1, wherein said lamp located inside said enclosure is secured in a rigid vertical manner to allow light rays to penetrate both of said plastic lenses.

3. The illuminated brake warning system of claim 1, wherein a mounting pedestal supports said enclosure sufficiently above a rear shelf of the vehicle for visibility.

* * * * *